United States Patent [19]

Roth

[11] Patent Number: 5,546,365
[45] Date of Patent: Aug. 13, 1996

[54] RECORD CARRIERS CONTAINING A USER'S PREFERRED ORDER OF REPRODUCTION OF ITEMS OF INFORMATION INCLUDED THEREIN, AND APPARATUS FOR USE WITH AND/OR FOR CREATING SUCH RECORD CARRIERS

[75] Inventor: Rudolf Roth, Eindhoven, Netherlands

[73] Assignee: U.S. Philips Corporation, New York, N.Y.

[21] Appl. No.: 332,619

[22] Filed: Oct. 31, 1994

Related U.S. Application Data

[63] Continuation of Ser. No. 174,633, Dec. 28, 1993, abandoned, which is a continuation of Ser. No. 914,483, Jul. 15, 1992, abandoned, which is a continuation of Ser. No. 366,807, Jun. 14, 1989, abandoned.

[30] Foreign Application Priority Data

Jun. 15, 1988 [GB] United Kingdom ............... 8814236
May 22, 1989 [GB] United Kingdom ............... 8911756

[51] Int. Cl.$^6$ ........................................ G11B 7/00
[52] U.S. Cl. .................... 369/032; 369/47; 369/54; 369/58; 369/275.3
[58] Field of Search .................... 369/32, 275.1, 369/275.2, 275.3, 47, 44.11, 58, 13, 48; 360/77.01, 15

[56] References Cited

U.S. PATENT DOCUMENTS

| | | | |
|---|---|---|---|
| 3,660,616 | 5/1972 | Davidge et al. | 179/100.2 MD |
| 4,301,482 | 11/1981 | Trevithick | 369/32 |
| 4,496,997 | 1/1985 | Ohtsuki | 360/15 |
| 4,667,314 | 3/1987 | Iwashima | 369/32 |
| 4,733,386 | 3/1988 | Shimai | 369/59 |
| 4,779,252 | 10/1988 | Custers et al. | 369/47 |
| 4,789,979 | 12/1988 | Hiraoka et al. | 369/32 |
| 4,817,075 | 3/1989 | Kikuchi et al. | 369/47 |
| 4,862,439 | 8/1989 | Ando et al. | 369/58 |
| 4,872,151 | 10/1989 | Smith | 369/32 |
| 4,932,016 | 6/1990 | Yoshida et al. | 369/48 |
| 4,933,923 | 6/1990 | Veenis et al. | 369/32 |
| 5,023,856 | 6/1991 | Raaymakers et al. | 369/32 |
| 5,058,096 | 10/1991 | Ando et al. | 369/53 |
| 5,124,963 | 6/1992 | Ando | 369/58 |
| 5,367,510 | 11/1994 | Ando | 369/54 |

FOREIGN PATENT DOCUMENTS 169597 1/1986 European Pat. Off. .

OTHER PUBLICATIONS

"Principles of Optical Disc Systems" by G. Bouwhuis et al, Published by Adam Hilger, Bristol, UK at pp. 237 et seq. (ISBN 0–85274–78503).

"Erasable Magneto–Optical Recording" by M. Hartmann, R. A. J. Jacobs and J. J. M. Braat in Philips Technical Review, vol. 42, No. 2 (Aug. 1985).

"Subcodes Explained" by J. R. Watkinson in Electronics and Wireless World Magazine, Sep. 1986 at pp. 26 to 30.

*Primary Examiner*—Nabil Z. Hindi
*Attorney, Agent, or Firm*—Richard A. Weiss

[57] ABSTRACT

Record carriers containing a user's preferred order of reproduction of items of information included therein, and reproducing apparatus for use with and/or recording apparatus for creating the record carriers. The reproducing apparatus reproduces items of information which have been recorded on the record carrier at respective locations within a single continuous time sequence in accordance with the user's preferred order of reproduction after reading information containing the user's preferred order of reproduction from the record carrier. The recording apparatus enable the user's preferred order of reproduction to be entered into the recording apparatus, and records information containing the user's preferred order of reproduction on the record carrier. The record carriers may include a user writable region and a pre-mastered region including pointer information identifying where within the user writable region a user table of contents is or will be located.

105 Claims, 4 Drawing Sheets

| Q1 | Q2 | Q3 | Q4 | Q5 | Q6 | Q7 | Q8 | Q9 | |
|----|----|----|----|----|----|----|----|----|---|
| 00 | A3 | xx | xx | xx | xx | 01 | 00 | 35 | } TOC |
| ⋮ | ⋮ | ⋮ | ⋮ | ⋮ | ⋮ | ⋮ | | | |
| 00 | B0 | xx | xx | xx | xx | 01 | xx | xx | |
| 00 | B1 | xx | xx | xx | xx | 08 | xx | xx | |
| 00 | B2 | xx | xx | xx | xx | 61 | 20 | 54 | |
| 00 | 01 | 06 | 01 | 47 | 01111111 | 02 | 02 | 00 | |
| 00 | 02 | 12 | 58 | 25 | 00000101 | 06 | 05 | 07 | |
| 00 | 03 | 17 | 02 | 64 | 00000110 | 13 | 04 | 65 | } UTOC |
| 00 | 04 | 22 | 12 | 65 | 11111111 | 18 | 23 | 43 | |
| 00 | 05 | 31 | 04 | 17 | 10000001 | 24 | 11 | 20 | |
| 00 | 06 | 35 | 42 | 28 | 10000010 | 31 | 10 | 64 | |
| 00 | 07 | 49 | 20 | 12 | 00000011 | 43 | 51 | 37 | |
| 00 | 08 | 54 | 09 | 65 | 00000100 | 49 | 25 | 18 | |

| Q1 | Q2 | Q3 | Q4 | Q5 | Q6 | Q7 | Q8 | Q9 | ← Q |

| Q1 | Q2 | Q3 | Q4 | Q5 | Q6 | Q7 | Q8 | Q9 | |
|----|----|----|----|----|----|----|----|----|---|
| 00 | 01 | 06 | 01 | 47 | 00 | 03 | 02 | 00 | |
| 00 | 02 | 12 | 58 | 25 | 00 | 06 | 05 | 07 | |
| 00 | 03 | 16 | 02 | 64 | 00 | 13 | 04 | 65 | |
| 00 | A0 | xx | xx | xx | 00 | 01 | xx | xx | TOC |
| 00 | A1 | xx | xx | xx | 00 | 03 | xx | xx | |
| 00 | A2 | xx | xx | xx | 00 | 61 | 20 | 54 | |
| 00 | A3 | xx | xx | xx | 00 | 17 | 20 | 35 | |
| 00 | D0 | 01 | AA | 05 | 06 | 07 | 08 | 02 | DPFTS |
| 00 | D1 | 03 | 07 | 08 | FF | xx | xx | xx | |
| 00 | B0 | xx | xx | xx | xx | 04 | xx | xx | |
| 00 | B1 | xx | xx | xx | xx | 08 | xx | xx | |
| 00 | B2 | xx | xx | xx | xx | 61 | 20 | 54 | |
| 00 | B3 | xx | xx | xx | xx | 16 | 30 | 05 | |
| 00 | 04 | 22 | 12 | 65 | 80 | 18 | 23 | 43 | UTOC |
| 00 | 05 | 31 | 04 | 17 | 80 | 24 | 11 | 20 | |
| 00 | 06 | 35 | 42 | 28 | 80 | 31 | 10 | 64 | |
| 00 | 07 | 49 | 20 | 12 | 00 | 43 | 51 | 37 | |
| 00 | 08 | 54 | 09 | 65 | 00 | 49 | 25 | 18 | |

RECORD CARRIERS CONTAINING A USER'S PREFERRED ORDER OF REPRODUCTION OF ITEMS OF INFORMATION INCLUDED THEREIN, AND APPARATUS FOR USE WITH AND/OR FOR CREATING SUCH RECORD CARRIERS

This is a continuation of Application Ser. No. 08/174,633, filed on Dec. 28, 1993, now abandoned, which is a continuation of application Ser. No. 07/914,483, filed on Jul. 15, 1992, now abandoned, which is a continuation of Application Ser. No. 07/366,807, filed on Jun. 14, 1989, now abandoned.

BACKGROUND OF THE INVENTION

The invention relates to an apparatus for reproducing information recorded on a record carrier, the information comprising a plurality of items which are disposed on the record carrier at predetermined locations within a single, continuous time sequence. The apparatus is capable of reproducing the recorded items in accordance with a user's preferred sequence (i.e., order).

The invention also relates to an apparatus for recording information on a record carrier, and to a combined recording and reproducing apparatus. Still further, the invention relates to record carriers which are used and/or produced by the aforementioned apparatus.

An apparatus of the type set forth in the opening paragraph is known, for example, in the form of a Compact-Disc Digital Audio (CD-DA) player, the record carrier in that case being an optically readable disc containing coded digital data representing one or more audio signals. Audio information is stored in a continuous time sequence along a single spiral track with parts of the recording identified conveniently by a subcode stored on the disc in parallel with audio data. The subcode indicates, during playback, a current track number (for example to identify a single piece of music), an index (identifying a smaller section within a track) and values giving elapsed time from the start of the disc (absolute time) and from the start of the track (relative time).

Codes capable of identifying the items referred to in the opening paragraph can be entered by a user via a key pad to select individual items to be played. The codes may identify the items by track number, by track number plus index or by specifying elapsed time coordinates. These three options offer successively increasing freedom in choosing the items to be played, but at the cost of increased complexity of operation for the user and a more expensive player.

There is a continuing demand for features in such equipment which allow the user more freedom to control the operation of the player. Consequently, some players incorporate features such as a program memory so that the user can select a number of items in advance. Such features are provided in recognition of the fact that users will often not wish to hear all of the items recorded on the record carrier and/or may wish to reproduce them in a different order to that in which they are recorded.

At a further level of sophistication, N. V. Philips' Gloeilampenfabrieken have produced CD-DA players incorporating features which are designated "Favorite Track Selection" or FTS. One example is available in model number CD-650 and allows a user's preferred list of track numbers to be stored for each of a number of different records. The FTS feature is described in detail in EP-A-0169597. This known player, with FTS, has a non-volatile memory in which it stores the user's preferred lists of track numbers for a number of record carriers (Compact Discs). Each list has a header containing a code made by selecting arbitrary bytes from the data stored on the disc. For all practical purposes, the code is unique to each disc and is used to identify whether a disc loaded into the player is one for which a preferred sequence has been stored. Thus, the user, whose favorite tracks on a particular pre-recorded disc will generally not change from day, to day can hear the preferred sequence of tracks every time he/she plays that disc without having to re-program the sequence every time.

While the programming facilities have been described above in the context of Compact-Disc Digital Audio, it will be appreciated that such facilites can be provided for users of any recording medium where the player can access items from different parts of the record at random, including audio and video recording media. This is particularly the case with digital recording systems where time codes or other address information are recorded automatically with the signal data.

Whereas the present Compact Disc Digital Audio (CD-DA) system does not provide for users to record their own programe material onto an optical disc, there are other systems where the apparatus comprises recording and reproducing means. The best-known examples are magnetic tape cassette recorders for analog audio and video recording, the newly-available Digital Audio Tape (DAT), digital video recording and erasable Compact Disc.

SUMMARY OF THE INVENTION

It is an aim of the invention to further increase the freedom of users to control the reproduction of information recorded on information carriers, particularly in the field of audio and video reproducing equipment for consumers.

The invention provides an apparatus of the type set forth in the opening paragraph, characterized in that the apparatus further comprises a device for reading information defining the preferred reproduction sequence (i.e., order) for the items recorded on that record carrier from part of the record carrier itself.

The invention further provides an apparatus for recording information on a record carrier, the apparatus comprising an input enabling a user to enter information defining a preferred sequence for the reproduction of items of information which are recorded on a given record carrier at predetermined locations in a single continuous time sequence, and a device for writing information defining the preferred reproduction sequence on a part of the given record carrier. The information defining the preferred reproduction sequence can subsequently be read and used to reproduce the recorded items in accordance with the preferred sequence by a reproducing apparatus as set forth in the preceding paragraph. The user of the apparatus is thereby able to have the items of information stored on the record carrier reproduced automatically in accordance with his/her preferred sequence.

This is particularly advantageous when used with home-made recordings, because in that case the items may have been recorded individually over a period of time from different sources, and some items may have been erased and new ones recorded at a later date. Thus, the items on a home-recorded carrier may end up disposed substantially at random within the continuous time sequence, and perhaps with large gaps in between them. The invention enables the order of reproduction to be chosen with complete freedom so as to enable a logical and pleasing sequence to be obtained, even though the order in which items are recorded may be dictated by the availability of the source of the recording, or may be chosen in order to make efficient use of the space on the carrier.

In commercially produced, pre-recorded carriers, the record producers will generally have taken some care in selecting the sequence of items recorded. However, users still have a desire to program their own sequences. Provided that pre-recorded material is provided on record carriers that are writable at least in part, the invention provides a facility having the same effect as FTS in the known apparatus but which has substantial advantages over the known system. Any reproducing apparatus in accordance with the invention can read the information defining the preferred sequence from a record carrier even though that information was written by a different (but compatible) apparatus, situated perhaps in a different part of the house, or in a friend's house. This forms a substantial improvement over the known FTS system, where the user's preferred selection is stored only within the player on which it was programmed.

It is noted that GB 1 337 163 proposed a dictating machine in which information recorded on a record carrier defines a preferred reproduction time sequence for items such as standard sentences recorded on the same carrier. However, in that proposed machine each item is recorded on a separate fixed-length track on the carrier, rather than at scattered locations within a single continuous time sequence.

In a reproducing apparatus in accordance with the invention, a reading device may be arranged to read the information defining the preferred sequence from a lead-in part of the record carrier corresponding to locations within the continuous time sequence distinct from the locations at which the items of information are recorded. The reproducing apparatus can be constructed to read the lead-in part of the record carrier automatically when a carrier is loaded, and can, thus, always find the information defining the preferred sequence without having to search among the recorded items themselves. Also, the preferred sequence can then be changed without disturbing the recorded items.

In such a reproducing apparatus, the reading device may be arranged to read the information defining the preferred sequence as part of a table of contents identifying and locating the items recorded on the record carrier. Thus, the position (if any) of each item in the preferred sequence can be read along with information enabling the apparatus to locate the item on the carrier.

Alternatively, the reading device may be arranged to read the information defining the preferred sequence from locations within the lead-in part of the track distinct from locations containing a table of contents identifying and locating the items recorded on the record carrier. Such an arrangement has the advantage that the preferred sequence can be changed without having to re-write the table of contents on the record carrier. Rewriting the table of contents may take a relatively long time if there are a large number of items listed, for example, and may cause the introduction of errors.

In such a reproducing apparatus, the reading device may be arranged to read the information defining the preferred sequence from locations defined by a predetermined offset relative to a starting location of the table of contents. In embodiments where the location of the lead-in part has to be determined for each given record carrier, this enables the table of contents and preferred sequence information both to be located from a single base location. The apparatus may further comprise a display for displaying character information read from locations within the lead-in part of the record carrier defined by a different predetermined offset relative to the starting location of the table of contents.

The information defining the preferred sequence may comprise a list of track numbers, the device for reproducing the stored items being arranged to use the list in conjunction with the table of contents in order to determine the locations within the continuous time sequence of the items in the preferred sequence. This ensures that the preferred sequence is compactly represented, so that it may be entered, written or erased relatively quickly.

In a reproducing apparatus in accordance with the invention, the device for reproducing the recorded items may comprise a device for reading information recorded in a main data channel of an audio and/or video recording on the record carrier, and the device for reading the information defining the preferred sequence may comprise a device for reading information recorded in a subcode channel recorded in parallel with the data channel. For example, in the Compact Disc and Digital Audio Tape systems digital "subcode" information is recorded in parallel with the audio data for control functions, and is also used in a lead-in portion of the Compact Disc to store the table of contents of conventional pre-recorded pre-mastered recordings. In video recordings, too, digital control information can be carried in parallel with the main information channel. A well known example of a subcode in a video channel is Teletext.

The apparatus may be suitable for reproducing items of information from an erasable digital optical disc. Such discs may offer CD-DA compatible recording and reproduction, with very fast access times compared with DAT.

In a CD-DA-compatible embodiment, the information defining the preferred sequence may be read from the Q-channel of the subcode. This has the advantage that existing apparatus are capable of extracting the Q-channel data and can, therefore, form part of an apparatus in accordance with the invention with minimal adaptation.

A recording apparatus in accordance with the invention may comprise a device for recording items of information on a record carrier and a device for writing in a lead-in part of the record carrier a table of contents identifying the recorded items and defining their locations within the continuous time sequence. The table of contents so written can be read and used by reproducing apparatus as set forth hereinbefore. In such a recording apparatus, the writing device may be arranged to include in the table of contents information to enable the protection of recorded items against accidental erasure. Valued recordings can, thus, be identified as such and protected. The writing device may be arranged to include in the table of contents information defining a most recently recorded location on the record carrier and also defining the last location within the continuous time sequence at which an item is recorded.

The recording apparatus may comprise device for using the table of contents to identify and locate areas of the record carrier that are free to receive new items to be recorded. Such a feature may allow quick access to a free area, and may provide information on its length. This enables efficient use and re-use of the area of the record carrier.

The invention still further provides a combined recording and reproducing apparatus comprising a recording apparatus as set forth hereinbefore and a reproducing apparatus capable of reproducing items of information from a record carrier in accordance with a preferred reproduction sequence defined by information recorded on the record carrier by the recording apparatus.

Finally, the invention also relates to record carriers which are used and/or produced by the above-described reproducing and recording apparatus. Those record carriers have information recorded therein which defines the preferred sequence.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
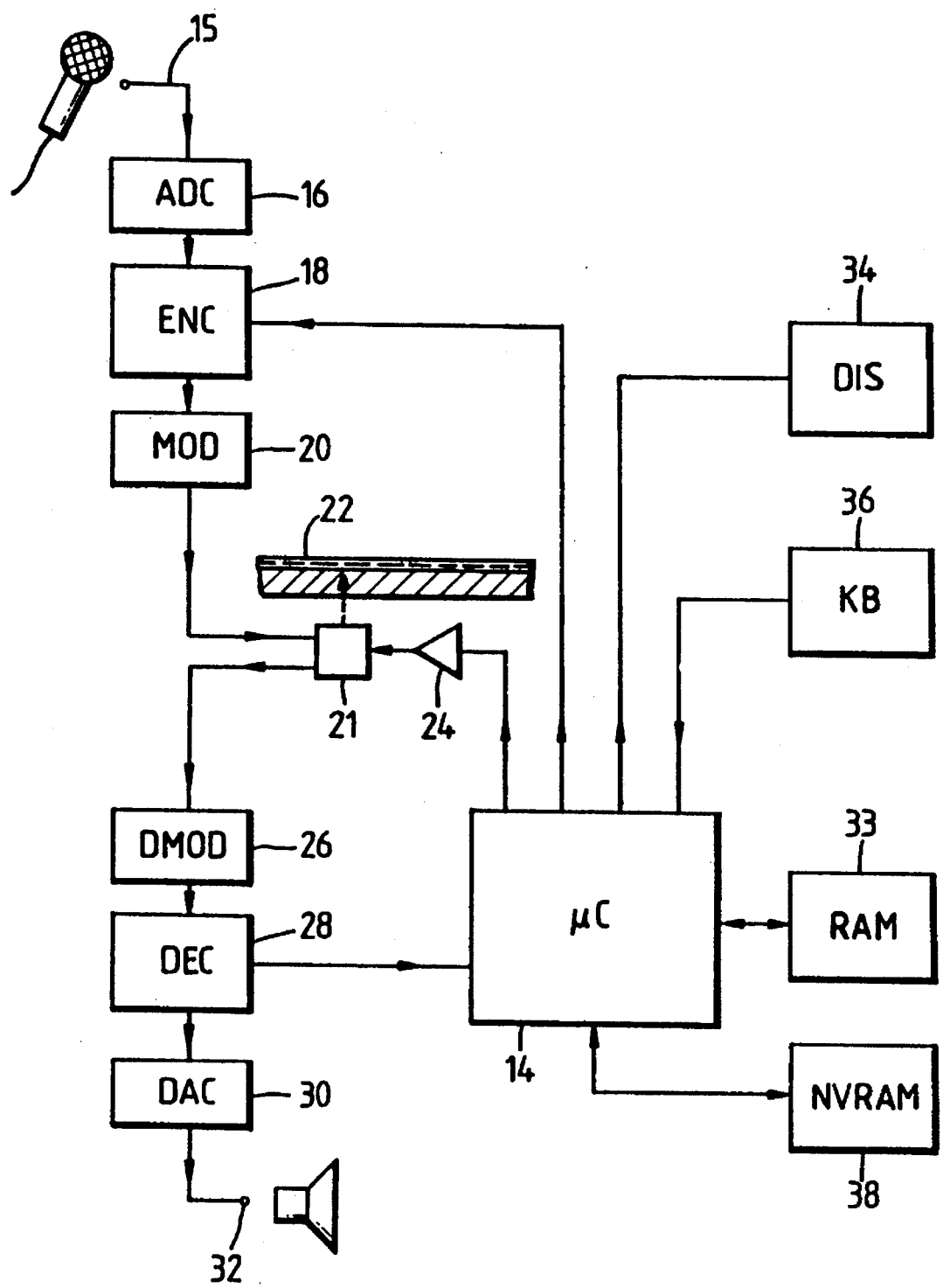
FIG. 1 is a schematic block diagram of a combined recording and reproducing apparatus in accordance with the present invention.

FIG. 1 is a schematic block diagram of a recording and reproducing apparatus in accordance with the present invention. The invention will be described in the context of digital audio recording, by way of example only, and in particular in the context of recording on an erasable optical disc, again by way of example only. Optical disc recording has advantages over tape recording in that random access to different parts of the recording is quicker. Also, erasable optical discs can use the same format and encoding techniques as the well-known Compact Disc system, ensuring compatability with available pre-recorded discs. The format of data on Digital Audio Tape is very similar, as well, so far as the information content is concerned.

The apparatus shown in FIG. 1 can operate, under the control of a microcomputer 14, in either a recording (writing) mode or a reproducing (reading) mode. In the recording mode, an input 15 receives analog audio signals (normally stereophonic) from an external source and feeds them to an analog to digital converter (ADC) 16. The digital output of the ADC 16 is fed to an encoder 18. The microcomputer 14 supplies the encoder 18 with additional 'subcode' information, which is to be stored along with the audio data on the carrier 22.

The encoder 18 expands, interleaves and scrambles the audio data to provide error detection and correction capability. The output of the encoder 18 is fed to a modulator 20 which performs the eight-to-fourteen modulation (EFM) required to generate the pattern of marks in the spiral track of the disc. The operation of the encoder 18 and modulator 20 in the Compact Disc Digital Audio (CD-DA) System is well known and a description can be found for example in "Principles of Optical Disc Systems" by G. Bouwhuis et. al., published by Adam Hilger, Bristol, UK at pages 237 et seq (ISBN 0-85274-785-3).

The stream of information generated by the modulator 20 is fed to a read/write device 21 which modifies a part of a record carrier 22 in order to store the audio and subcode data. The read/write device 21 could in fact comprise two separate devices, one for reading and one for writing, but in practice both functions can be implemented with substantially the same device, in both magnetic and optical recording.

In the case where the carrier 22 is an erasable optical disc, recording may be, for example by means of the magneto-optical recording technique or by means of the phase-change technique. magneto-optical recording is described in an article entitled "Erasable magneto-optical recording" by M. Hartmann, B. A. J. Jacobs and J. J. M. Braat in Philips Technical Review, Volume/42, No. 2 (August 1985) at pages 37 to 47. In magneto-optical recording, the read/write device 21 may be a pulsed laser and an electromagnet combined with a tracking and focusing system.

The microcomputer 14 controls the relative positions of the read/write device 21 and the carrier 22 by means of a group of actuators 24. In the case of optical disc recording, this is implemented as a number of servo mechanisms, for example for controlling the speed of rotation of the disc and the radial position (tracking) and focusing of the read/write device 21. Such systems are well known and are described fully in the reference "Principles of Optical Systems" at pages 125 et seq. If, alternatively, the carrier 22 were in the form of a tape, then the position control would be implemented primarily by the tape transport mechanism, together in some embodiments with a rotating head assembly.

In the reproducing (reading) mode, the read/write device 21 acts as a reading head to retrieve the data from the carrier 22. The data is passed to a demodulator 26, then to a decoder 28 and digital to analog converter (DAC) 30 before emerging at an output 32 as an analog audio signal. The blocks 26 to 30 thus perform the inverse of the function of the blocks 16 to 20. The decoder 28 performs error correction and concealment functions, so that 'dropouts' caused by dust, scratches or manufacturing flaws in the disc will not be audible in the output signal.

The decoder 28 also separates the subcode information from the audio data and passes the subcodes to the microcomputer 14. The microcomputer 14 is, thus, able to detect the position of the read/write device 21 along the recorded track. The subcode in the Compact Disc Digital Audio system conveys the time elapsed from the beginning of the spiral track in minutes, seconds and frames (75 frames per second). The subcode also conveys the current track number and index, and other information about the recording.

In order to enable the apparatus to determine in advance where on the disc to look for a given item, the subcodes are also used, during a lead-in portion of the recording, to store a table of contents (TOC) listing all the tracks recorded and their location (minutes, seconds, frames) along the spiral track. When a disc is inserted into the apparatus, the TOC is read and stored in a random access memory (RAM) 33. The subcode format and the table of contents in the CD-DA system are described fully in an article "Subcodes Explained" by J. R. Watkinson in Electronics and Wireless World magazine, September 1986 at pages 26 to 30. The embodiments of the present invention described hereinafter will comprise modifications of the CD-DA subcode format as described therein.

Information about the track being played and elapsed time, etc., is displayed for the user on a display 34 under control of the microcomputer 14. Information can be entered by the user via an input device 36 such as a keyboard. The information entered may include the track number of a piece of music the user wants to hear, and the microcomputer 14 can use this information and the table of contents (TOC) stored in the RAM 33 to locate the time coordinate of the track on the record carrier and produce the desired output. Alternatively, the user may enter a time coordinate directly.

Sequences (i.e., orders) of track numbers (or time coordinates) can be entered and stored in the RAM so that the user can program a whole sequence (i.e., order) of tracks to be played in turn. The apparatus is provided with the Favorite Track Selection (FTS) feature so that the user may, upon entering such a sequence, indicate that the sequence is to be stored as an FTS sequence for that record carrier. The microcomputer 14 is connected to a non-volatile memory (NVRAM) 38, for storing the identification codes and FTS sequences for non-writable record carriers (such as conventional Compact Discs) which may be in the user's collection along with writable ones. The operation of the FTS feature by the user, in so far as it relates to such non-writable record carriers, may be exactly as described in the first-mentioned reference, EP-A-0169597.

The operation of the FTS feature with writable discs, in accordance with the present invention can also be identical from the point of view of the user, as with non-writable record carriers, but with the advantages of the present invention in addition. Within the apparatus, however, there are two major differences between the operation of FTS for non-writable record carriers and writable record carriers. Firstly, with a writable record carrier there is no need to generate the "fingerprint" or ID-code in order to identify which FTS sequence belongs to which record carrier: the sequence will be recorded on the carrier itself. The second difference is simply that the operations performed in the known FTS player in order to store the FTS sequences in the NVRAM are replaced by a sequence of operations to write the FTS sequence on the record carrier itself. Embodiments enabling these operations to be performed will be described hereinafter with the aid of numerical examples, with reference to FIGS. 2–5.

Figure 2:
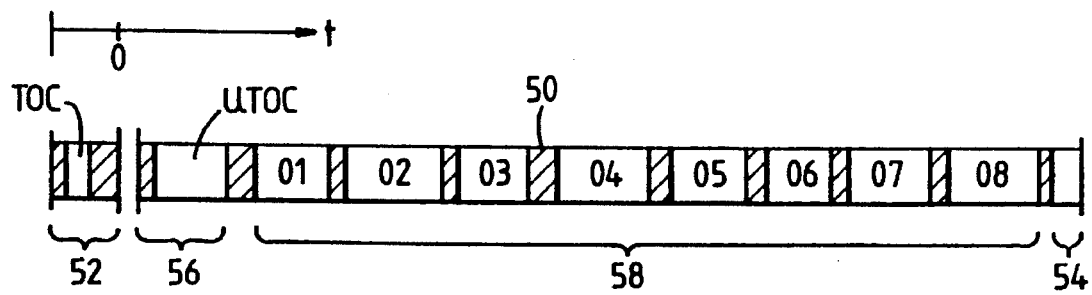
FIG. 2 shows the organization of data on a record carrier in a first embodiment of the invention.

FIG. 2 shows the organization of data on a record carrier in a first embodiment of the invention. The record carrier in this particular embodiment is an erasable optical disc.

The information is recorded along a track 50 which in the case of an optical disc comprises a continuous spiral of marks in a recording layer of the disc. The total length of the track corresponds to a first time sequence, running from left to right as shown. In the CD-DA system, upon which this embodiment is based, the beginning of the track is at the center of the spiral and the end of the track is at the outer edge. If the record carrier were to be a tape, then the length of the track 50 might correspond directly to the length of the tape.

In a version of the Compact Disc which is both writable and erasable, it is proposed that a certain amount of information should be fixed in a spiral groove structure during manufacture of the blank discs. This information may include a time-code signal, running the entire length of the track, so that information recorded by the user can be properly located and synchronized. One method of providing a time code signal without disturbing the data channel format is to provide a pre-groove structure with a "wobble" on it, the wobble being frequency-modulated with the time code information. Such a technique is described in European Patent Application EP-A-0 265 984. For the purpose of describing the present embodiments of the invention, it is sufficient to appreciate that the absolute time coordinate is available at all points on the track, even in unrecorded portions. In accordance with the CD-DA standard, times on the disc are expressed in minutes, seconds and frames, where each second is divided into 75 frames.

In addition to the pre-groove, the spiral track 50 is provided with a pre-mastered lead-in area 52 and a pre-mastered lead-out area 54. These areas are formed at manufacture by the same technique as conventional CD manufacture, and can be read by a conventional CD player. The pre-mastered lead-in section 52 contains information, for example, on the type of disc, but also includes a pre-mastered table of contents TOC.

It will be seen hereinafter with regard to FIGS. 4 and 5 that the pre-mastered area can include pre-recorded items in conventional CD-DA format, but in this example, the TOC simply contains a pointer to the location of a non-mastered lead-in area 56 containing a user table of contents UTOC which is both writable and erasable. Following the lead-in area 56 is the main data area 58 containing the items of information (for example, pieces of music) which are to be reproduced.

On the carrier shown, eight items or "tracks", numbered 01 to 08, are recorded along the spiral track 50. Each track 01 to 08 has a starting time and a stopping time, in minutes, seconds and frames as shown in Table 1 (below). Thus track 01 starts at 2 minutes, 2 seconds and 0 frames and ends at 6 minutes, 1 second and 47 frames from the start of the spiral track 50, and so on. It should be appreciated that the areas shown in FIG. 2 are not to scale, and that the figures used in this embodiment are by way of example only.

TABLE 1

| TRACK | START | STOP | WP | SEQ |
|-------|---------|---------|----|-----|
| 01 | 02'02"00 | 06'01"47 | RO | — |
| 02 | 06'05"07 | 12'58"25 | RO | 5 |
| 03 | 13'04"65 | 17'02"64 | RO | 6 |
| 04 | 18'23"43 | 22'12"65 | RW | — |
| 05 | 24'11"20 | 31'04"17 | RW | 1 |
| 06 | 31'10"64 | 35'42"28 | RW | 2 |
| 07 | 43'51"37 | 49'20"12 | RO | 3 |
| 08 | 49'25"18 | 54'09"65 | RO | 4 |

Table 1 shows other information which it is desired to store within UTOC in accordance with the first embodiment of the present invention. The fourth column WP indicates whether or not each track has been write-protected. In the example, tracks 01, 02, 03, 07 and 08 are read-only (RO), or in other words are protected against accidental erasure. Tracks 04, 05 and 06 are read/write (RW), and can be erased and overwritten at will.

The fifth column, headed SEQ, defines an example of a user's preferred sequence for the tracks 01 to 08. Column SEQ for track 05 has the value 1 and so track 05 is first in the sequence, track 06 is second and so on. Thus the preferred sequence is 05-06-07-08-02-03, the tracks 01 and 04 being skipped altogether.

The information contained in Table 1 can be stored on the disc in the non-pre-mastered lead-in area 56, within UTOC. UTOC is a modified form of the table of contents TOC defined in the CD-DA standard, as described by Wilkinson in the reference "Subcodes Explained".

In the CD-DA format, the subcode signal conveys eight 98-bit words (P–W) every frame (1/75 second). In the present case, we are concerned only with the Q-word, and further are concerned only that the Q-word can convey nine bytes of useful information in every frame.

Figure 3:
FIG. 3 shows in more detail of part of the data stored in the embodiment of FIG. 2.

FIG. 3 shows the use of the nine bytes Q1 to Q9 of the Q-word of the subcode in the TOC and UTOC areas of the spiral track 50 described with reference to FIG. 2 and Table 1. Each row in FIG. 3 represents the nine bytes Q1 to Q9 of one Q-word. On the disc each word is repeated a number of times in succession, in order to ensure reliable information, because the subcode is not provided with error correction capability. This repetition occurs three times in the conventional CD-DA standard, but may be done ten times or more in an erasable system, where errors are more likely to occur.

Throughout the pre-mastered lead-in area 52 and the non-pre-mastered lead-in area 56 the first byte Q1 has the value 00 (hex), as described by Wilkinson. In the main data area 58, byte Q1 carries the current track number in binary-coded decimal (BCD) format. Thus there can be up to 99 tracks on a given disc.

The second byte Q2 defines the meaning of the bytes which follow. The first word shown in FIG. 3, in the pre-mastered TOC area, has Q2=A3. This defines that the bytes Q7, Q8 and Q9 of that word contain the time coordinate, in minutes, seconds and frames respectively of the start of UTOC, again in BCD format. Thus in the example, UTOC begins at a time one minute, no seconds and thirty-five frames (1'00"35) after the start of the end of the pre-mastered lead-in area 52, which is referred to as an absolute time coordinate.

Upon reading the Q-word shown in TOC, which is always at the start of the spiral track 50, a reproducing apparatus in accordance with the invention can locate the area UTOC on the disc and read the contents of UTOC, which identifies and locates the items recorded by the user. The first three words shown in UTOC in FIG. 3 are analagous to the last three words of the TOC in the CD-DA standard. When Q2=B0 hex, then Q7 defines the first track on the disc (01 in the example). When Q2=B1 hex, Q7 defines the last track (08). When Q2=B2 hex, the bytes Q7, Q8 and Q9 give the absolute time coordinate of the start of the lead-out area 54.

In the next eight words of UTOC shown, Q2 takes the value of each track number 01 to 08 recorded on the disc in turn. The bytes Q7, Q8 and 09 of each such row define the start time of the corresponding track, as can be seen by comparison with Table 1. In the CD-DA system, the bytes Q3 to 05 of each such entry are used to carry a running time coordinate throughout the lead-in area. Because there is a time code encoded in the pre-groove as described hereinbefore, it is possible to use bytes Q3, Q4 and Q5 to define the stop time of each track entered in the UTOC. This enables the microcomputer software within the apparatus to calculate the location of blank areas of the disc so that new data can be recorded wherever there is space. The same function could be provided by storing the duration of each track instead of its stop time. A different technique would be to define a new track at the start of the blank area and identify it in some way as a free area. Again, software within the apparatus can identify the blank tracks as free areas for future recordings.

The byte Q6 has so far not been described and in the CD-DA standard it is defined as 00 hex and not used for any purpose. In this embodiment of the present invention, the byte Q6 is used within UTOC to convey information for the write protection and preferred sequence features. Following the example of Table 1, the most significant bit of byte Q6 in each entry in UTOC is used to define whether the corresponding track (defined in byte Q2) is read-only (Q6= 0) or read/write (Q6=1). The choice of Q6=0 to represent a read-only track affords compatibility with conventional CD-DA discs in which Q6=0, as defined by the standard. This leaves 7 bits for encoding the user's preferred sequence (i.e., order). It will be remembered that up to 99 tracks can be entered in the UTOC, and so up to 99 positions must be allowed in the preferred sequence. This is possible in 7-bits using natural binary instead of BCD. Tracks which are to be skipped completely are marked by having a '1' in every one of the seven least significant bits. The values of byte Q6 for each entry in UTOC, as shown in FIG. 3 can be compared with the columns WP and SEQ in Table 1 for further clarification. It will be seen for example that the value of byte Q6 when byte Q2=03 hex is 00000110 binary (06 hex), which is interpreted by the apparatus reading the disc as meaning that track 03 is read-only and is sixth in the preferred sequence. Similarly, track 04 (Q6=11111111 binary=FF hex) is read/write and is not in the preferred sequence at all.

To define a preferred sequence and write it on part of a disc, the user enters a preferred list of track numbers via the input device 36 of an apparatus such as that shown in FIG. 1. A replica of the area UTOC is stored in the RAM 33 at all times and is modified by the microcomputer 14 to define the preferred sequence. To write the information defining the preferred sequence, the apparatus simply re-writes the area UTOC, including the special byte Q6, onto the disc, overwriting the existing area UTOC.

It is a feature of this first embodiment that changing the preferred sequence requires re-writing of the entire UTOC area, even if it is only the user's preferred sequence that has been changed. Given that there may be 99 entries in UTOC, and given that each entry is repeated perhaps ten times to ensure reliable retrieval, re-writing the UTOC may take up to fifteen seconds in the worst case, even though 75 Q-words can be written every second.

To reproduce the recorded items in accordance with the preferred sequence, rather than the sequence in which they are recorded along the spiral track 50, the apparatus must first read the area UTOC from the record carrier. This is normally done immediately after the carrier is loaded, and the contents of the area UTOC are stored in the RAM so that the reading head can be directed 30 to the parts of the disc required without further reference to the lead-in area of the disc. In order to reproduce the recorded items in accordance with the preferred sequence read from the disc from within the area UTOC, the entries in the area UTOC are searched, examining the byte Q6 each time until the entry identifying the first item in the preferred sequence is found. The stored time coordinates in bytes Q7, Q8 and Q9 can then be used to locate and reproduce the item, and then the area UTOC can be searched for the second, third, fourth, etc. items in turn.

Figures 4, 5:
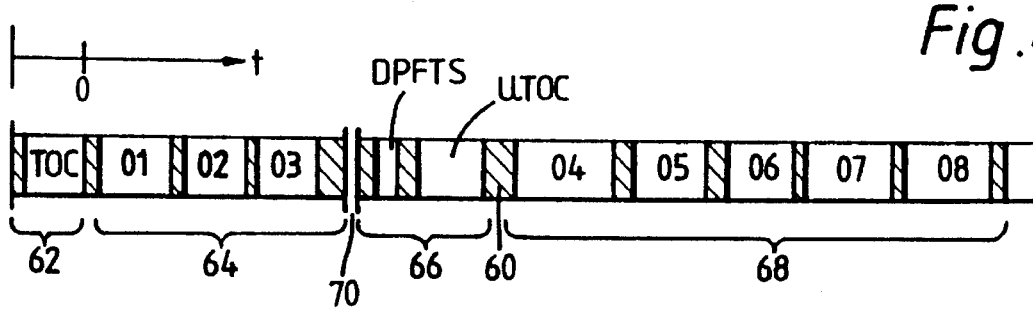
FIG. 4 shows the organization of data on a record carrier in a second embodiment of the invention.
FIG. 5 shows in more detail part of the data stored in the embodiment of FIG. 4.

FIG. 4 shows the organization of data on a record carrier in accordance with a second embodiment of the invention. The spiral track 60 shown is physically similar to spiral track 50 in the first embodiment, but with two differences in the organization of the information content. This second embodiment illustrates the provision of both pre-mastered and writable/erasable recordings on the same disc. The pre-mastered area in the spiral track 60 includes a lead-in area 62 including a ore-mastered table of contents TOC and a pre-mastered main data area 64 including three non-erasable tracks of programe material, namely tracks 01, 02 and 03.

The writable/erasable portion of the spiral track 60 comprises a lead-in area 66 and a main data area 68, similar to those of the spiral track 50 in the first embodiment, except that the lead-in area includes an area DPFTS (disc programmable favorite track selection) in addition to a user table of contents UTOC, as will be described in more detail with reference to FIG. 5. The main data area 68 of the writable/erasable portion contains five recorded tracks, numbered 04 to 08 to follow on from the numbering of the pre-mastered tracks 01 to 03. The two pre-mastered and writable portions may be separated by a small "no-go" area 70, to avoid disorientation of the mechanism of a reproducing apparatus which might occur at an unexpected transition form one type of track (stamped, for example) to another (magneto-optical or phase-change, for example).

Time coordinates of the tracks 01 to 08 and their other attributes in the second embodiment are shown, by way of example only, in Table 2. The columns have the same meaning as in Table 1, and the time coordinates differ from those of the first embodiment in two cases only. The preferred sequence, defined by a user, is shown in column SEQ and is the same as that of the first example except that at the end of the sequence tracks 07 and 08 are repeated to illustrate how the second embodiment of the present invention allows the same item to feature in the preferred sequence more than once. The full preferred sequence for the tracks 01 to 08 on the spiral track 60 is thus 05-06-07-08-02-03-07-08. Write protection (column WP) is the same for the tracks 01 to 08 as in the first embodiment, although it should be appreciated that tracks 01 to 03 are inevitably read-only (RO) because they are recorded in the pre-mastered portion of the spiral track 60.

TABLE 2

| TRACK | START | STOP | WP | SEQ |
|---|---|---|---|---|
| 01 | 03'02"00 | 06'01"47 | RO | — |
| 02 | 06'05"07 | 12'58"25 | RO | 5 |
| 03 | 13'04"65 | 16'02"64 | RO | 6 |
| 04 | 18'23"43 | 22'12"65 | RW | — |
| 05 | 24'11"20 | 31'04"17 | RW | 1 |
| 06 | 31'10"64 | 35'49"28 | RW | 2 |
| 07 | 43'51"37 | 49'20"12 | RO | 3, 7 |
| 08 | 49'25"18 | 54'09"65 | RO | 4, 8 |

FIG. 5 shows the format of the areas TOC, DPFTS and UTOC in the spiral track 60, using the FIGURE of Table 2 as an example. The Q-word of the Compact Disc subcode is used, as in the first embodiment and the references Q1 to Q9 will again be used for the bytes of that word. The area TOC defines the start and stop times of the pre-mastered tracks 01, 02 and 03 when byte Q2 takes the values 01, 02 and 03 respectively. In the embodiment of FIGS. 4 and 5, the byte Q6 does not convey preferred sequence information, but still conveys the write-protection information. Byte Q6 takes the value 00 hex for a read-only (RO) track and 80 hex for a read/write (RW) track.

The Q-words shown where the byte Q2 takes the values A1 hex and A1 hex in the area TOC, define the first and last tracks as 01 and 03 respectively; that where Q2=A2 hex points to the lead-out area; and the Q-word having Q2=A3 hex points to the start of the area UTOC, which is at 17'20"35 in the present example.

The area UTOC identifies and locates the remaining, non-pre-mastered tracks 04 to 08, and defines tracks 04 and 08 as the first and last tracks in the writable/erasable portion of the spiral track 60. In this respect, the pre-mastered and writable portions of an erasable Compact Disc are organized analagously to the organization of recordings which occupy a series of two or more separate CD-DA discs.

The area UTOC also contains the time coordinate of the area DPFTS. In the example shown, this coordinate is 16'30"05 and is written in the bytes Q7, Q8, Q9 of a Q-word marked by the value B3 in the byte Q2. The value B3 has been chosen arbitrarily from those hexadecimal values not already assigned to another function and any distinctive value or group of values could be used. The area DPFTS is placed on the spiral track 60 before the area UTOC because the latter area will normally vary in length far more than the former area, but DPFTS and UTOC could equally be stored anywhere on the disc, since the entries in TOC marked by Q2=A3 and Q2=B3 can point to any part of the recording.

In the area DPFTS, two Q-words (each repeated ten times for reliable reproduction) are required to define the eight tracks of the preferred sequence. The first word of DPFTS is marked by the value D0 in the byte Q2. This again is an arbitrary choice from the hexadecimal codes available. The codes D1, D2, D3 and so on can be used to identify continuations of the DPFTS area as may be required to store longer sequences.

In the byte Q3 of the first word in the area DPFTS there is space for a user number, 01 in the example shown, to be described hereinafter. The bytes which follow list the track numbers of the items in the preferred sequence, in order. The list is marked at its start by a byte having the value AA hex and marked at its end by a byte having the value FF hex. The preferred sequence is defined in exact correspondence with the sequence defined in Table 2, namely 05-06-07-08-02-03-07-08. Using all the codes D0 to DF for continuations of the list defining the preferred sequence, the preferred sequence should include more than a hundred tracks, and can include a given track more than once.

The user number, 01 in the example, can be used to identify the user whose preferred sequence is defined by the list which follows, and a preferred sequence can be defined for each of a number of users. This is in recognition of the fact that the preferred sequence is something personal to each user and different users may prefer a different sequence of tracks. In FIG. 5, only one preferred sequence is defined, but further sequences could be written in the area DPFTS, with user numbers 02, 03 etc.. The same facility could also be achieved by providing a separate area DPFTS for each user. Each area DPFTS could then be identified and located by a different entry in the area UTOC, for example using the values B4, B5, B6, etc. for the byte Q2 to identify the area DPFTS for each user in turn.

To write the area DPFTS on the spiral track 60, the user operates the controls of the recording apparatus (such as that shown in FIG. 1) to define the preferred sequence. This preferred sequence can be stored in RAM as a list of track numbers. When complete, the user can specify his or her user number, and instruct the apparatus to write the area DPFTS on the spiral track 60 as described.

To reproduce the recorded information, the apparatus will read the areas TOC and UTOC and store the contents in RAM, as in a normal CD player. The area DPFTS can also be read and stored in RAM or can be read only when required. To reproduce the tracks in accordance with a preferred sequence stored on the disc, the user must specify his or her user number (if more than one user has programmed a preferred sequence on the disc) and the microcomputer within the apparatus can search the area DPFTS for that user number and retrieve the list of track numbers defining that user's preferred sequence. By using the area UTOC (normally duplicated within the RAM), the time coordinates of each track in the sequence can be found and the reading device directed to the appropriate part of the disc to reproduce each track in turn.

The second embodiment just described has advantages over the first embodiment for various reasons. Firstly, there is no need to rewrite the entire area UTOC each time the preferred sequence is changed. Second, a different preferred sequence can be defined by each of a plurality of users and written on the disc independently of those of other users. A further advantage is that a given recorded item can appear more than once in the preferred sequence.

The second embodiment is also advantageous where some items are provided on a pre-mastered, non-writable part of the disc. The preferred sequence written in accordance with the second embodiment can include or exclude the pre-mastered items as desired, whereas in the first embodiment it could not, unless the pre-mastered tracks were identified in the area UTOC as well as in the area TOC. This also makes possible the provision of disc-programmable FTS on a completely pre-mastered disc, so long as there is provided a writable/erasable portion large enough to store an area DPFTS. On such a disc, the pre-mastered table of contents TOC may contain a pointer to the area DPFTS, or there may be provided a minimal user table of contents area UTOC to maintain compatibility with the embodiment described.

Figures 6, 7:
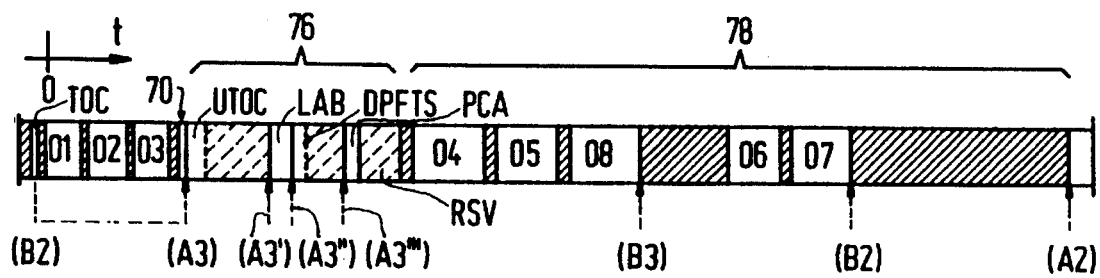
FIG. 6 shows the organization of data on a record carrier in a third embodiment of the invention.
FIG. 7 shows in more detail part of the data stored in the embodiment of FIG. 6.

FIGS. 6 and 7 illustrate a third embodiment of the invention, in the same manner that FIGS. 4 and 5 illustrate the second embodiment, and some of the same reference signs as are used above will be used below to describe the third embodiment. The third embodiment has the advantages mentioned in the two preceding paragraphs and includes other advantageous features as well.

FIG. 6 shows that a non-pre-mastered lead-in area 76 now includes, in order of increasing timecode value t, a user table of contents UTOC, a label area LAB, a favorite track selection area DPFTS, a power calibration area PCA and a reserved area RSV. The areas LAB and DPFTS are only used optionally, but permanent spaces are provided for them at timecode locations (A3') and (A3") which are fixed relative to the first location (A3) of the UTOC, defined by the bytes Q7, Q8 and Q9 of the Q-word having Q2=A3 in the pre-mastered table of contents TOC. This avoids the need to store a separate pointer to each such area, and to dynamically allocate space for them when the area is required.

FIG. 7 shows the format of the Q-words in the areas TOC, UTOC, LAB and DPFTS in the third embodiment. Throughout the non-pre-mastered lead-in area 76 the byte Q1 has a value OA (hex) to distinguish it from the pre-mastered lead-in area 62, as well as from the programe data areas. The area UTOC begins, at the location (A3) (equal to 17'20"35 in the example), with four "B-pointers", these being Q-words identified by Q2 taking the values B0, B1, B2 and B3 in turn. As in the second embodiment, the bytes Q7 of the B0 and B1 pointers give, respectively, the lowest and highest track numbers (04 and 08) recorded in the non-pre-mastered programme area 78. However, the bytes Q8 and Q9 of the B0 pointer are now also used, in a manner to be described below with reference to the areas LAB and DPFTS respectively.

The bytes Q7, Q8 and Q9 of the B2 pointer contain the stop location of the outermost (highest t) recorded track (track 07 in the example), rather than the final lead-out area. The bytes Q7, Q8 and Q9 of the B3 pointer contain the stop location of the most recently recorded track (08 in the example). This information can be used by the microprocessor 14 to identify blank spaces suitable for recording new tracks.

The area UTOC includes enough space for the four B-pointers and 99 track pointers (Q2=01, 02, . . . 99). Since each is recorded 10 times for security, the area UTOC thus occupies 10×(4+99)=1030 frames (13"55) of the Q-subcode in the lead-in area 76. The area LAB follows immediately, at the time code location (A3')=(A3+13"55) and includes space for two "C-pointers", defined by Q2=C0 and Q2=C1, requiring 20 subcode frames. The byte Q8 of the B0 pointer (Q2=B0) contains the number of C-pointers used, and can take the value 00 or 02 only. In this example, the byte Q8 has the value 02 and the Q-words with Q2=C0 and Q2=C1 are used to carry a label comprising up to 14 ASCII character codes (bytes Q3 to Q9 of these two Q-words). When recording, the user can specify the label to be recorded using the keyboard 36. When playing back the recorded tracks, the label can be presented to the user via the display 34 to help identify the disc.

At the location (A3")=(A3+13"55+0"20) immediately following the C-pointers (LAB), space is provided for up to 15 D-pointers (Q2=D0, D1, . . . DE) to carry the favorite track selection (DPFTS). The last byte Q9 of the B0 pointer in UTOC contains the number of D-pointers actually used. In the example, only the first two D-pointers D0 and D1 are used, enough for a favorite track sequence of 14 track numbers to be stored in the bytes Q3 to Q9. In the example, there are only eight tracks in the sequence (05-06-07-08-02-03-07-08) and the unused bytes Q4 to Q9 of the D1 pointer are filled with the code FF hex. Since up to 15 D-pointers are provided for, the area DPFTS occupies 10×15=150 subcode frames (2"00). The three areas UTOC, LAB and DPFTS thus occupy 1030+20+150=1300 frames, or 16 seconds exactly.

After the location (A3''')=(A3+16"00) the power calibration area PCA occupies about one second or 75 subcode frames, and can be used by a recording apparatus to adjust the power levels of the laser required to read and erase data. The area PCA is followed by a reserved area RSV of about 12 seconds which can be used for various unspecified functions, so that the entire non-pre-mastered lead-in area 76 and the no-go area 70 take up about 30 seconds of the total recording time. It will be appreciated that the various areas are not shown to scale in FIG. 6.

It should be appreciated that the invention is substantially independent of the type of information recorded on the record carrier. The recorded items may be digital audio tracks, as described in the specific examples, but could equally be short video films (such as often accompany popular songs). In the same medium of combined audio and video, the recorded items could be individual arias from an opera performance. It will be appreciated that the invention is generally applicable, and that all specific applications described are presented by way of example only.

Similarly, the organization and format of the recorded data is a matter for design to suit the particular application and the medium used.

From reading the present disclosure, other modifications will be apparent to persons skilled in the art. Such modifications may involve other features which are already known in the design, manufacture and use of reproducing and/or recording apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein, either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. An apparatus for reproducing items of information included on a record carrier having a pre-mastered region and a user writable region which are separate from each other the user writable region including a user writable lead-in part, the apparatus comprising:

reproduction means for reproducing items of information included on the record carrier in accordance with a user's preferred order of reproduction of items of information included on the record carrier; and read means for reading from the pre-mastered region pointer information which identifies a location in the user writable lead-in part in which at least a portion of a user table of contents which identifies in a particular order locations on the record carrier of items of information recorded on the record carrier by a user is located, and from the user writable lead-in part (a), on the basis of the pointer information, the user table of contents, and (b) user preferred order information which identifies the user's preferred order of reproduction.

2. The apparatus as claimed in claim 1, wherein said read means reads the user preferred order information from a portion of the user writable lead-in part which is at a predetermined offset relative to the user table of contents.

3. The apparatus as claimed in claim 2, wherein said read means reads character information read from a portion of the user writable lead-in part which is at a different predetermined offset relative to the user table of contents, and the apparatus further comprises means for displaying the character information.

4. The apparatus as claimed in claim 1, wherein the user preferred order information includes a list of track numbers, and the apparatus further comprises means for determining from the list and the user table of contents the locations on the record carrier of items of information included on the record carrier for which the track numbers are identified in the list.

5. The apparatus as claimed in claim 1, wherein the record carrier is a user-recordable digital optical disc.

6. The apparatus as claimed in claim 1, wherein said read means read from the user writable lead-in part selection information which defines a plurality of users' preferred orders of reproduction respectively corresponding to respective users.

7. An apparatus for recording items of information on a record carrier having a pre-mastered region and a user writable region which are separate from each other, the user writable region including a user writable lead-in part and the pre-mastered region including pointer information which identifies a location in the user writable lead-in part in which at least a portion of a user table of contents which identifies in a particular order locations on the record carrier of items of information recorded on the record carrier by a user is to be located, the apparatus comprising:

input means for enabling a user to enter user preferred order information defining a user's preferred order of reproduction of items of information which have been included on the record carrier; and write means for recording in the user writable lead-in part (a), on the basis of the pointer information, the user table of contents, and (b) the user preferred order information.

8. The apparatus as claimed in claim 7, wherein said write means is adapted to include in the user table of contents information for protecting each of the items of information recorded on the record by the user against accidental erasure.

9. The apparatus as claimed in claim 7, wherein said write means is adapted to include in the user table of contents information identifying the location on the record carrier of the last of the items of information recorded on the record carrier by the user.

10. The apparatus as claimed in claim 7, further comprising means adapted to determine from the user table of contents those areas of the record carrier on which items of information have not yet been included and are thereby available for recording items of information by the user.

11. The apparatus as claimed in claim 7, wherein said write means records the user preferred order information in a portion of the user writable lead-in part which is at a predetermined offset relative to the user table of contents.

12. The apparatus as claimed in claim 11, Wherein said write means records user-defined character data at at least one location in the user writable lead-in part which is at a different predetermined offset relative to the user table of contents.

13. The apparatus as claimed in claim 1, wherein said read means reads the user preferred order information from a portion of the user writable lead-in part which corresponds to one or more locations which are distinct from the locations in which the items of information recorded on the record carrier by the user are located.

14. The apparatus as claimed in claim 1, wherein said read means reads (a) the items of information included on the record carrier in accordance the user's preferred order of reproduction from a main data channel and (b) the user preferred order information from a sub-code channel.

15. The apparatus as claimed in claim 1, wherein the record carrier is an erasable record carrier having a format which is compatible with the CD-DA standard.

16. The apparatus as claimed in claim 1, wherein the record carrier is a write-once record carrier having a format which is compatible with the CD-DA standard.

17. An apparatus for reproducing items of information included on a record carrier having a pre-mastered lead-in part and a user writable lead-in part, the pre-mastered lead-in part and the user writable lead-in part being separate from each other, the apparatus comprising:

reproduction means for reproducing items of information included on the record carrier in accordance with a user's preferred order of reproduction of items of information included on the record carrier; and read means for reading (a) from the pre-mastered lead-in part a pre-mastered table of contents which identifies in a first particular order locations on the record carrier of pre-mastered items of information included on the record carrier, and (b) from the user writable lead-in part (i) a user table of contents which identifies in a second particular order locations on the record carrier of items of information recorded on the record carrier by a user, and (ii) user preferred order information which identifies the user's preferred order of reproduction.

18. The apparatus as claimed in claim 17, wherein said read means reads the user preferred order information from a portion of the user writable lead-in part which is separate from the user table of contents.

19. The apparatus as claimed in claim 17, wherein said read means reads the user preferred order information from a portion of the user writable lead-in part in which at least a part of the user table of contents is located.

20. The apparatus as claimed in claim 17, wherein said read means reads the user preferred order information from a portion of the user writable lead-in part which corresponds to one or more locations in the record carrier which are distinct from the locations in which the items of information recorded on the record carrier by the user are located.

21. The apparatus as claimed in claim 17, wherein said read means reads the user preferred order information from a portion of the user writable lead-in part which is a predetermined offset relative to the pre-mastered table of contents.

22. The apparatus as claimed in claim 21, wherein said read means reads character information from a portion of the user writable lead-in part of the record carrier which is at a different predetermined offset relative to the pre-mastered table of contents, and the apparatus further comprises means for displaying the character information.

23. The apparatus as claimed in claim 17, wherein the user preferred order information includes a list of track numbers, and the apparatus further comprises means for determining from the list, the pre-mastered table of contents and the user table of contents locations on the record carrier of the items of information included on the record carrier for which the track numbers are identified in the list.

24. The apparatus as claimed in claim 17, wherein the record carrier is a user-recordable digital optical disc.

25. The apparatus as claimed in claim 17, wherein said read means reads from the user writable lead-in part selection information which defines a plurality of users' preferred orders of reproduction respectively corresponding to respective users.

26. The apparatus as claimed in claim 17, wherein said read means reads (a) the items of information included on the record carrier in accordance the user's preferred order of reproduction from a main data channel and (b) the user preferred order information from a sub-code channel.

27. The apparatus as claimed in claim 17, wherein the record carrier is an erasable record carrier having a format which is compatible with the CD-DA standard.

28. The apparatus as claimed in claim 17, wherein the record carrier is a write-once record carrier having a format which substantially is compatible with the CD-DA standard.

29. An apparatus for recording items of information on a record carrier having a pre-mastered lead-in part, including a pre-mastered table of contents which identifies in a first particular order locations on the record carrier of pre-mastered items of information included on the record carrier, and a user writable lead-in part, the pre-mastered lead-in part and the user writable lead-in part being separate from each other, the apparatus comprising:

input means for enabling a user to enter user preferred order information defining a user's preferred order of reproduction of items of information which have been included on the record carrier; and write means for recording in the user writable lead-in part (a) the user preferred order information, and (b) a user table of contents which identifies in a second particular order locations on the record carrier of items of information recorded on the record carrier by the user.

30. The apparatus as claimed in claim 29, wherein said write means is adapted to include in the user table of contents information for protecting each of the items of information recorded on the record carrier by the user against accidental erasure.

31. The apparatus as claimed in claim 29, wherein said write means is adapted to included in the user table of contents information identifying the location on the record carrier of the last of the items of information recorded on the record carrier by the user.

32. The apparatus as claimed in claim 29, further comprising means adapted to determine from the user table of contents those areas of the record carrier on which items of information have not yet been included and are thereby available for recording items of information by the user.

33. The apparatus as claimed in claim 29, wherein said write means records the user preferred order information in a portion of the user writable lead-in part which is at a predetermined offset relative to the pre-mastered table of contents.

34. The apparatus as claimed in claim 33, wherein said write means records user-defined character data in a portion of the user writable lead-in part which is at a different predetermined offset relative to the pre-mastered table of contents.

35. An apparatus for reproducing items of information included on a record carrier having a pre-mastered region and a user writable region, the apparatus comprising:

read means for reading (a) a portion of the pre-mastered region including pointer information identifying wherein within the user writable region a user table of contents is included, and (b) the user table of contents on the basis of the pointer information, the user table of contents having location information identifying locations in the user writable region in which items of information have been recorded; and reproduction means for reproducing items of information recorded in the user writable region on the basis of the location information.

36. The apparatus as claimed in claim 35, wherein the portion of the pre-mastered region which includes the pointer information is a part of a pre-mastered table of contents included therein having location information identifying locations in the pre-mastered region in which items of information have been included.

37. The apparatus as claimed in claim 35, wherein said read means reads from the user writable region user preferred order information which identifies a user's preferred order of reproduction of items of information included on the record carrier, and said reproduction means is adapted to reproduce items of information included on the record carrier in accordance with the user's preferred order of reproduction.

38. An apparatus for recording items of information on a record carrier having a pre-mastered region and a user writable region, the apparatus comprising:

recording means for recording (a) items of information in the user writable region, and (b) a user table of contents in a lead-in portion of the user writable region, the user table of contents having location information identifying locations in the user writable region in which items of information have been recorded; and determining means for determining from pointer information included in the pre-mastered region where within the user writable region the user table of contents is to be recorded.

39. The apparatus as claimed in claim 38, further comprising input means for enabling a user to enter user preferred order information defining a user's preferred order of reproduction of items of information which have been included on the record carrier, and wherein said recording means thereafter records the user preferred order information in the lead-in part of the user writable region.

40. A record carrier, comprising:
- a user writable region, the user writable region including a user writable lead-in part which includes (a) a user table of contents which identifies in a particular order locations in the record carrier of items of information recorded by a user, and (b) user preferred order information which identifies a user's preferred order of reproduction of items of information included in the record carrier; and
- a pre-mastered region which is separate from the user writable region, the pre-mastered region including pointer information which identifies a location in the user writable lead-in part in which at least a portion of the user table of contains is located.

41. The record carrier as claimed in claim 40, wherein the user preferred order information is in a portion of the user writable lead-in part which is at a predetermined offset relative to the user table of contents.

42. The record carrier as claimed in claim 41, wherein the user writable lead-in part further includes character display information in a portion thereof which is at a different predetermined offset relative to the user table of contents.

43. The record carrier as claimed in claim 40, wherein the user writable lead-in part includes selection information which defines a plurality of users' preferred orders of reproduction respectively corresponding to respective users.

44. The record carrier as claimed in claim 40, wherein the user table of contents includes information for protecting each of the items of information recorded in the record carrier by the user against accidental erasure.

45. The record carrier as claimed in claim 40, wherein the user table of contents includes information identifying the location in the record carrier of the last of the items of information recorded on the record carrier by the user.

46. The record carrier as claimed in claim 40, wherein the user table of contents includes information which enables determination of those areas of the record carrier in which items of information have not yet been included and are thereby available for recording items of information by the user.

47. The record carrier as claimed in claim 40, wherein the user preferred order information is in a portion of the user writable lead-in part which corresponds to one or more locations which are distinct from the locations in which the items of information recorded by the user are located.

48. The record carrier as claimed in claim 40, wherein items of information included in the record carrier are identified by track numbers, and the user preferred order information includes a list of track numbers.

49. The record carrier as claimed in claim 40, wherein items of information included in the record carrier which are in accordance with the user's preferred order are in a main data channel, and the user preferred order information is in a sub-code channel.

50. The record carrier as claimed in claim 40, wherein the record carrier is a user-recordable digital optical disc.

51. The record carrier as claimed in claim 40, wherein the record carrier is an erasable record carrier having a format which is compatible with the CD-DA standard.

52. The record carrier as claimed in claim 40, wherein the record carrier is a write-once record carrier having a format which is compatible with the CD-DA standard.

53. A record carrier, comprising:
- a pre-mastered lead-in part, the pre-mastered lead-in part including a pre-mastered table of contents which identifies in a first particular order locations in the record carrier of pre-mastered items of information included in the record carrier; and
- a user writable lead-in part which is separate from the pre-mastered lead-in part, the user writable lead-in part including (a) a user table of contents which identifies in a second particular order locations in the record carrier of items of information recorded in the record carrier by a user, and (b) user preferred order information which identifies a user's preferred order of reproduction of items of information included in the record carrier.

54. The record carrier as claimed in claim 53, wherein the user preferred order information is in a portion of the user writable lead-in part which is separate from the user table of contents.

55. The record carrier as claimed in claim 53, wherein the user preferred order information is in a portion of the user writable lead-in part in which at least a part of the user table of contents is located.

56. The record carrier as claimed in claims 53, wherein the user preferred order information is in a portion of the user writable lead-in part which corresponds to one or more locations in the record carrier which are distinct from the locations in which the items of information recorded in the record carrier by the user are located.

57. The record carrier as claimed in claim 53, wherein the user preferred order information is in a portion of the user writable lead-in part which is at a predetermined offset relative the pre-mastered table of contents.

58. The record carrier as claimed in claim 51, wherein the user writable lead-in part further includes character display information in a portion thereof which is at a different predetermined offset relative to the pre-mastered table of contents.

59. The record carrier as claimed in claim 53, wherein the user writable lead-in part includes selection information which defines a plurality of users' preferred orders of reproduction respectively corresponding to respective users.

60. The record carrier as claimed in claim 53, wherein items of information included in the record carrier are identified by track numbers, and the user preferred order information includes a list of track numbers.

61. The record carrier as claimed in claim 53, wherein the user table of contents includes information for protecting each of the items of information recorded in the record carrier by the user against accidental erasure.

62. The record carrier as claimed in claim 53, wherein the user table of contents includes information identifying the location in the record carrier of the last of the items of information recorded in the record carrier by the user.

63. The record carrier as claimed in claim 53, wherein the user table of contents includes information which enables determination of those areas of the record carrier in which items of information have not yet been included and are thereby available for recording items of information by the user.

64. The record carrier as claimed in claim 53, wherein the items of information included in the record carrier which are in accordance with the user's preferred order are in a main data channel, and the user preferred order information is in a sub-code channel.

65. The record carrier as claimed in claim 53, wherein the record carrier is a user-recordable digital optical disc.

66. The record carrier as claimed in claim 53, wherein the record carrier is an erasable record carrier having a format which is compatible with the CD-DA standard.

67. The record carrier as claimed in claim 53, wherein the record carrier is a write-once record carrier having a format which substantially is compatible with the CD-DA standard.

68. A record carrier, comprising:

a user writable region including a user table of contents having location information identifying locations in the user writable region in which items of information have been recorded; and a pre-mastered region which is separate from the user writable region including pointer information identifying wherein within the user writable region the user table of contents is located.

69. The record carrier as claimed in claim 68, wherein the pre-mastered region includes a pre-mastered table of contents having location information identifying locations in the pre-mastered region in which items of information have been included, and the pointer information is included in a portion of the pre-mastered region in which at least a part of the pre-mastered table of contents is located.

70. The record carrier as claimed in claim 68, wherein the user writable region further includes user preferred order information which identifies a user's preferred order of reproduction of items of information included in the record carrier.

71. The apparatus as claimed in claim 1, wherein said read mean reads the user preferred order information from a portion of the user writable lead-in part which is separate from the user table of contents.

72. The apparatus as claimed in claim 71, wherein said reads means reads the user preferred order information on the basis of reference information included in the user table of contents, which reference information references a location in the user writable lead-in part in which at least a portion of the user preferred order information is located.

73. The apparatus as claimed in claim 1, wherein said read means reads the user preferred order information from a portion of the user writable lead-in part in which at least a part of the user table of contents is located.

74. The apparatus as claimed in claim 1, wherein the pre-mastered region includes a pre-mastered lead-in part, and said read means reads from the pre-mastered lead-in part a pre-mastered table of contents which identifies in a particular order locations on the record carrier of pre-mastered items of information included on the record carrier.

75. The apparatus as claimed in claim 74, wherein said read means reads the user preferred order information from a portion of the user writable lead-in part which is at a predetermined offset relative to the pre-mastered table of contents.

76. The apparatus as claimed in claim 75, wherein said read means reads character information from a portion of the user writable lead-in part which is at a different predetermined offset relative to the pre-mastered table of contents, and the apparatus further comprises means for displaying the character information.

77. The apparatus as claimed in claim 74, wherein said read means reads the pointer information from a portion of the pre-mastered region in which at least a part of the pre-mastered table of contents is located.

78. The apparatus as claimed in claim 74, wherein the user preferred order information includes a list of track numbers, and the apparatus further comprises means for determining from the list, the pre-mastered table of contents and the user table of contents the locations on the record carrier of the items of information included on the record carrier for which the track numbers are identified in the list.

79. The apparatus as claimed in claim 7, wherein said write means records the user preferred order information in a portion of the user writable lead-in part which is separate from the user table of contents.

80. The apparatus as claimed in claim 79, wherein said write means is adapted to include in the user table of contents reference information which references a location in the user writable lead-in part in which at least a portion of the user preferred order information is to be located.

81. The apparatus as claimed in claim 80, wherein said write means records the user preferred order information in the user writable lead-in part on the basis of the reference information.

82. The apparatus as claimed in claim 7, wherein said write means records the user preferred order information in a portion of the user writable lead-in part in which at least a part of the user table of contents is located.

83. The apparatus as claimed in claim 7, wherein the pre-mastered region includes a pre-mastered lead-in part which includes a pre-mastered table of contents which identifies in a particular order locations on the record carrier of pre-mastered items of information included on the record carrier, and said write means records the user preferred order information in a portion of the user writable lead-in part which is at a predetermined offset relative to the pre-mastered table of contents.

84. The apparatus as claimed in claim 83, wherein said write means records user-defined character data at at least one location in the user writable lead-in part which is at a different predetermined offset relative to the pre-mastered table of contents.

85. The apparatus as claimed in claim 17, wherein said read means reads the user preferred order information from a portion of the user writable lead-in part which is at a predetermined offset relative to the user table of contents.

86. The apparatus as claimed in claim 85, wherein said read means reads character information from a portion of the user writable lead-in part which is at a different predetermined offset relative to the user table of contents, and the apparatus further comprises means for displaying the character information.

87. The apparatus as claimed in claim 29, wherein said write means records the user preferred order information in a portion of the user writable lead-in part which is separate from the user table of contents.

88. The apparatus as claimed in claim 29, wherein said write means records the user preferred order information in a portion of the user writable lead-in part in which at least a part of the user table of contents is located.

89. The apparatus as claimed in claim 29, wherein said write means records the user preferred order information in a portion of the user writable lead-in part which is at a predetermined offset relative to the user table of contents.

90. The apparatus as claimed in claim 89, wherein said write means records user-defined character data in a portion of the user writable lead-in part which is at a different predetermined offset relative to the user table of contents.

91. The apparatus as claimed in claim 36, wherein the user table of contents is at a predetermined offset relative to the pre-mastered table of contents identified by the pointer information.

92. The apparatus as claimed in claim 38, wherein said recording means records the user table of contents in one or more locations in the user writable region which are distinct from locations in which the items of information recorded on the record carrier by the user are located.

93. The apparatus as claimed in claim 38, wherein said recording means records the user preferred order information in a portion of the user writable lead-in part which is separate from the user table of contents.

94. The apparatus as claimed in claim 38, wherein said recording means records the user preferred order information in a portion of the user writable lead-in part in which at least a part of the user table of contents is located.

95. The record carrier as claimed in claim 40, wherein the user preferred order information is included in a portion of the user writable lead-in part which is separate from the user table of contents.

96. The record carrier as claimed in claim 95, wherein user table of contents includes reference information which references a location in the user writable lead-in part in which at least a portion of the user preferred order information is located.

97. The record carrier as claimed in claim 40, wherein the user preferred order information is included in a portion of the user writable lead-in part in which at least a part of the user table of contents is located.

98. The record carrier as claimed in claim 40, wherein the pointer information identifies a location in the user writable lead-in part in which the beginning of the user table of contents is located.

99. The record carrier as claimed in claim 40, wherein the pre-mastered region includes a pre-mastered lead-in part which includes a pre-mastered table of contents which identifies in a particular order locations on the record carrier of pre-mastered items of information included on the record carrier.

100. The record carrier as claimed in claim 99, wherein the pointer information is included in a portion of the pre-mastered region in which at least a part of the pre-mastered table of contents is located.

101. The record carrier as claimed in claim 100, wherein the user writable preferred order information is in a portion of the user writable lead-in part which is at a predetermined offset relative to the pre-mastered table of contents.

102. The record carrier as claimed in claim 101, wherein the user writable lead-in part further includes character display information in a portion thereof which is at a different predetermined offset relative to the pre-mastered table of contents.

103. The record carrier as claimed in claim 53, wherein the user preferred order information is in a portion of the user writable lead-in part which is at a predetermined offset relative the user table of contents.

104. The record carrier as claimed in claim 103, wherein the user writable lead-in part further includes character display information in a portion thereof which is at a different predetermined offset relative to the user table of contents.

105. The record carrier as claimed in claim 60, wherein the user table of contents is at a predetermined offset relative to the pre-mastered region.

\* \* \* \* \*